United States Patent
Kotab (10) Patent No.: US 9,264,856 B1
(45) Date of Patent: Feb. 16, 2016

(54) GEOGRAPHICAL APPLICATIONS FOR MOBILE DEVICES AND BACKEND SYSTEMS

(76) Inventor: Dominic M. Kotab, San Jose, CA (US)

( * ) Notice: Subject to any disclaimer, the term of this patent is extended or adjusted under 35 U.S.C. 154(b) by 249 days.

(21) Appl. No.: 12/556,791

(22) Filed: Sep. 10, 2009

Related U.S. Application Data (60) Provisional application No. 61/095,920, filed on Sep. 10, 2008.

(51) Int. Cl.
*H04W 4/02* (2009.01)
*H04W 64/00* (2009.01)

(52) U.S. Cl.
CPC ............ *H04W 4/023* (2013.01); *H04W 64/003* (2013.01)

(58) Field of Classification Search
CPC ... H04M 2242/30; H04W 4/02; H04W 4/021; H04W 4/023; H04W 4/025; G01C 21/26; G01C 21/3605; G01C 21/3608; G01C 21/3611; G01C 21/362; G01C 21/3679; G08G 1/096833; G08G 1/0968; G08G 1/0969
USPC ........ 455/456.1–457; 701/200–226, 400–541
See application file for complete search history.

(56) References Cited

U.S. PATENT DOCUMENTS

| | | | |
|---|---|---|---|
| 5,544,061 A * | 8/1996 | Morimoto et al. ............ | 701/202 |
| 6,314,365 B1 * | 11/2001 | Smith ............................ | 701/433 |
| 8,036,678 B2 | 10/2011 | Goldenberg et al. | |
| 8,532,678 B2 | 9/2013 | Geelen | |
| 8,538,458 B2 | 9/2013 | Haney | |
| 8,706,134 B2 | 4/2014 | Wasserman et al. | |
| 2002/0063472 A1 | 5/2002 | Irvin | |
| 2003/0216861 A1 * | 11/2003 | Sakata .......................... | 701/211 |
| 2004/0039504 A1 | 2/2004 | Coffee et al. | |
| 2005/0033509 A1 * | 2/2005 | Clapper ........................ | 701/201 |
| 2005/0065715 A1 | 3/2005 | Watanabe | |
| 2005/0198084 A1 | 9/2005 | Kim | |
| 2006/0084414 A1 * | 4/2006 | Alberth et al. ............. | 455/414.1 |
| 2006/0089160 A1 | 4/2006 | Othmer | |
| 2006/0223518 A1 * | 10/2006 | Haney ............................ | 455/420 |
| 2006/0253251 A1 * | 11/2006 | Puranik et al. ................ | 701/211 |
| 2006/0293850 A1 * | 12/2006 | Ahn et al. ..................... | 701/213 |

(Continued)

OTHER PUBLICATIONS

Non-Final Office Action Summary from U.S. Appl. No. 12/562,062 dated Jan. 10, 2012.

(Continued)

*Primary Examiner* — George Eng
*Assistant Examiner* — Marcus Hammonds
(74) *Attorney, Agent, or Firm* — Zilka-Kotab, PC (57) ABSTRACT

A method, according to one embodiment, includes receiving a request for a geographical destination from a mobile device, determining geographical coordinates of the destination, and transmitting the coordinates to the mobile device. According to another embodiment, a method includes receiving a verbal request for a geographical destination from a mobile device, determining geographical coordinates of the destination, and transmitting the coordinates to the mobile device. In another embodiment, a method includes transmitting a request for a geographical destination from a mobile device to a remote location, receiving geographical coordinates of the destination, and outputting a map showing at least one of a present location of the mobile device and the destination. In yet another embodiment, a method includes sending a present geographical location of a mobile device to a remote mobile device. Other methods for remote location determination and location access are described as well.

38 Claims, 6 Drawing Sheets

(56) References Cited

U.S. PATENT DOCUMENTS

| | | |
|---|---|---|
| 2007/0067088 A1 | 3/2007 | Baig |
| 2007/0150174 A1 | 6/2007 | Seymour et al. |
| 2008/0014971 A1* | 1/2008 | Morin et al. ............ 455/466 |
| 2008/0027635 A1 | 1/2008 | Tengler et al. |
| 2008/0036586 A1* | 2/2008 | Ohki ................... 340/539.13 |
| 2008/0102858 A1 | 5/2008 | Giniger et al. |
| 2008/0114541 A1 | 5/2008 | Shintani et al. |
| 2008/0167804 A1 | 7/2008 | Geelen et al. |
| 2008/0188246 A1 | 8/2008 | Sheha et al. |
| 2008/0268876 A1 | 10/2008 | Gelfand et al. |
| 2008/0319653 A1* | 12/2008 | Moshfeghi ............... 701/208 |
| 2009/0005968 A1 | 1/2009 | Vengroff et al. |
| 2009/0105940 A1 | 4/2009 | Bitan |
| 2009/0138353 A1 | 5/2009 | Mendelson |
| 2009/0233629 A1 | 9/2009 | Jayanthi |
| 2010/0191456 A1 | 7/2010 | Nogawa |
| 2013/0165086 A1* | 6/2013 | Doulton ................. 455/414.4 |

OTHER PUBLICATIONS

Final Office Action from U.S. Appl. No. 12/562,062 dated Oct. 12, 2012.
Non-Final Office Action from U.S. Appl. No. 12/562,062 dated Nov. 21, 2013.
Final Office Action from U.S. Appl. No. 12/562,062, dated Aug. 25, 2014.
Kotab, D.M., U.S. Appl. No. 12/562,062, filed Sep. 17, 2009.
Non-Final Office Action from U.S. Appl. No. 12/562,062, dated Feb. 5, 2014.

* cited by examiner

GEOGRAPHICAL APPLICATIONS FOR MOBILE DEVICES AND BACKEND SYSTEMS

RELATED APPLICATIONS

This application claims priority to U.S. provisional patent application No. 61/095,920, filed Sep. 10, 2008, and which is herein incorporated by reference.

FIELD OF THE INVENTION

The present invention relates to GPS systems, and more particularly to methods for retrieving and sending geographical directions and locations with a GPS enabled mobile device.

SUMMARY

A method, according to one embodiment, comprises receiving a request for a geographical destination from a mobile device, determining geographical coordinates of the destination, and transmitting the coordinates to the mobile device.

According to another embodiment, a method comprises receiving a verbal request for a geographical destination from a mobile device, determining geographical coordinates of the destination, and transmitting the coordinates to the mobile device.

In another embodiment, a method comprises transmitting a request for a geographical destination from a mobile device to a remote location, receiving geographical coordinates of the destination, and outputting a map showing at least one of a present location of the mobile device and the destination.

According to yet another embodiment, a method comprises transmitting a verbal request for a geographical destination from a mobile device to a remote location, receiving geographical coordinates of the destination, and outputting a map showing at least one of a present location of the mobile device and the destination.

In another embodiment, a method comprises receiving a present geographical location of a remote mobile device at a local mobile device and outputting a map showing a present location of at least one of the local mobile device and the received location of the remote mobile device.

In yet another embodiment, a method comprises sending a present geographical location of a mobile device to a remote mobile device.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Various embodiments of the present invention are described in further detail below with reference to the figures, in which like items are numbered the same in the several figures.

DETAILED DESCRIPTION

The following paragraphs describe certain features and combinations of features that can be used in connection with each of the methods of the invention and embodiments, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

According to one general embodiment, a method comprises receiving a request for a geographical destination from a mobile device; determining geographical coordinates of the destination; and transmitting the coordinates to the mobile device.

In another general embodiment, a method comprises receiving a verbal request for a geographical destination from a mobile device; determining geographical coordinates of the destination; and transmitting the coordinates to the mobile device.

In another general embodiment, a method comprises transmitting a request for a geographical destination from a mobile device to a remote location; receiving geographical coordinates of the destination; and outputting a map showing at least one of a present location of the mobile device and the destination.

In another general embodiment, a method comprises transmitting a verbal request for a geographical destination from a mobile device to a remote location; receiving geographical coordinates of the destination; and outputting a map showing at least one of a present location of the mobile device and the destination.

In another general embodiment, a method comprises receiving a present geographical location of a remote mobile device at a local mobile device; and outputting a map showing a present location of at least one of the local mobile device and the received location of the remote mobile device.

In another general embodiment, a method comprises sending a present geographical location of a mobile device to a remote mobile device.

Figure 1:
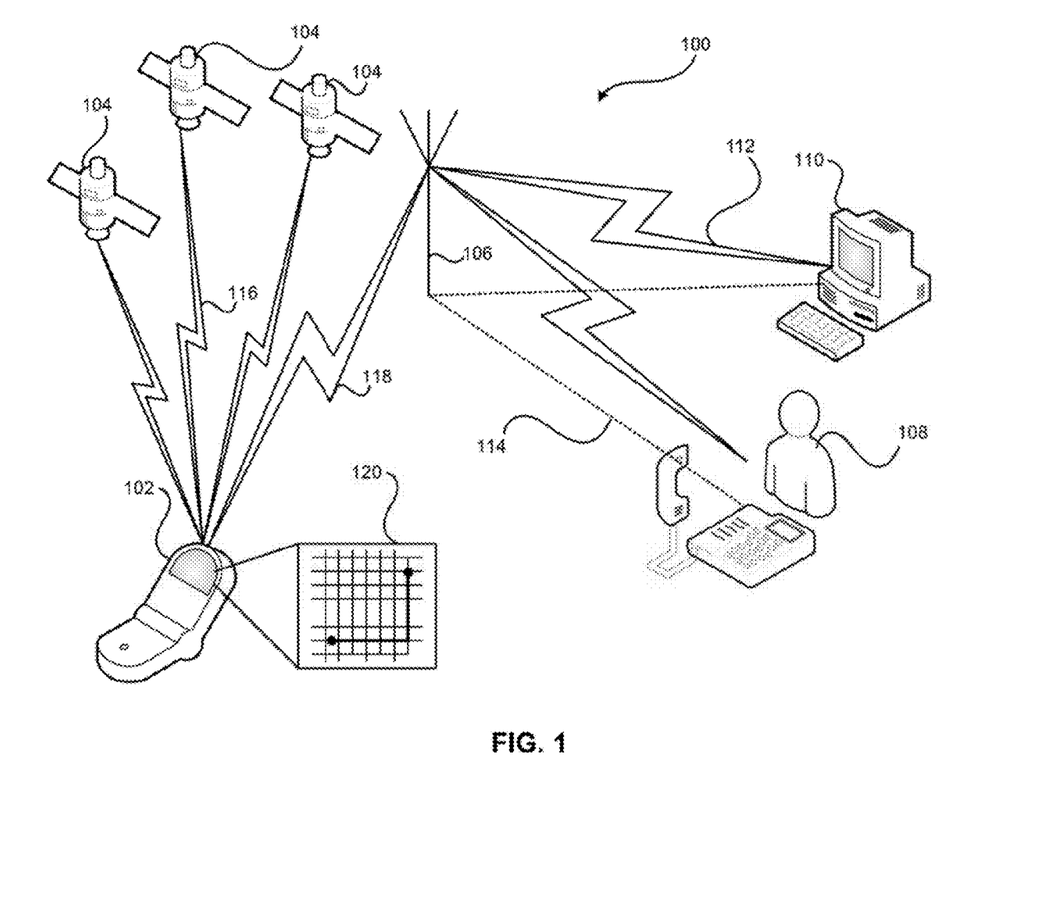
FIG. 1 is a simple schematic diagram of a system 100 for retrieving geographical directions according to one embodiment.

With reference to FIG. 1, a simple schematic diagram of a system 100 for retrieving geographical directions on a GPS-equipped mobile device is shown. FIG. 1 may be used to describe other methods of retrieving and sending directions and locations to and from GPS enabled mobile devices later in this application. A mobile device 102 may be any GPS-equipped device capable of sending and receiving GPS information such as a mobile telephone, personal digital assistant (PDA), personal GPS device, automobile mounted GPS device, BLACKBERRY® device, APPLE iPHONE®, mobile phone running ANDROID®, etc. The mobile device 102 may send and receive signals 116 from one or multiple GPS satellites 104, resulting in the satellites 104 being able to triangulate, pinpoint, approximate, or interpolate the location or approximate location of the mobile device 102. The mobile device 102 may also be capable of transmitting and receiving a standard mobile telephone signal 118, or short service message (SMS) or other text carrying signal which can then be sent from an antenna 106 or a satellite to an operator 108 or computer controlled automatic operator 110 via landline 114 or other communication technique 112. Other communication techniques include electronic communications across broadband devices, mobile telephone communications, satellite communications, etc. A landline indicates a terrestrial telephone network, which can be analog or preferably digital.

These channels of communication allow a user of the mobile device 102 to request directions to a location, which the operator 108 or computer controlled automatic operator 110 can decipher, e.g., via voice recognition, touch pad tone recognition, text recognition, etc., and return coordinates for the location to the mobile device 102, for purposes of the mobile device 102 displaying a present location of the mobile device 102 and/or a location of the desired destination and/or directions to proceed to the destination, possibly in the form of a map 120, text message, graphical layout, etc.

The user of the mobile device 102 may request directions via any available communications channel, such as via a telephone call to an operator 108 or computer controlled automatic operator 110, a text message to an operator 108 or computer controlled automatic operator 110, a telephone call into an automated response system (e.g., such that the user can enter keystrokes that signal desired responses to the automated response system), etc.

FIGS. 2-6 show various methods according to multiple embodiments. Each method may be carried out in the context of functionality of FIG. 1, or in any other environment as desired.

Figure 2:
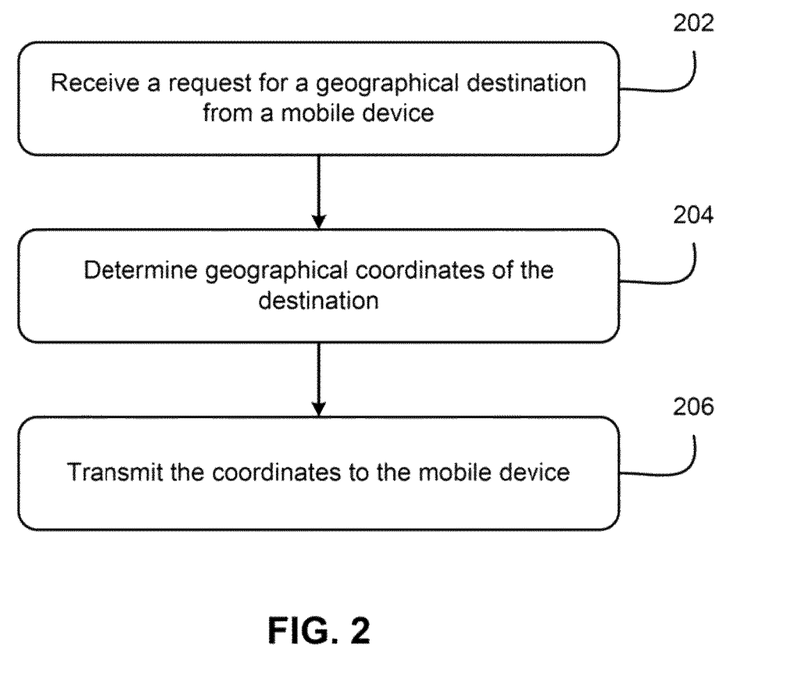
FIG. 2 shows a method according to one embodiment.

Referring to FIG. 2, in operation 202, a request for a geographical destination is received from a mobile device. In operation 204, geographical coordinates of the destination are determined. In operation 206, the coordinates are transmitted to the mobile device.

Figure 3:
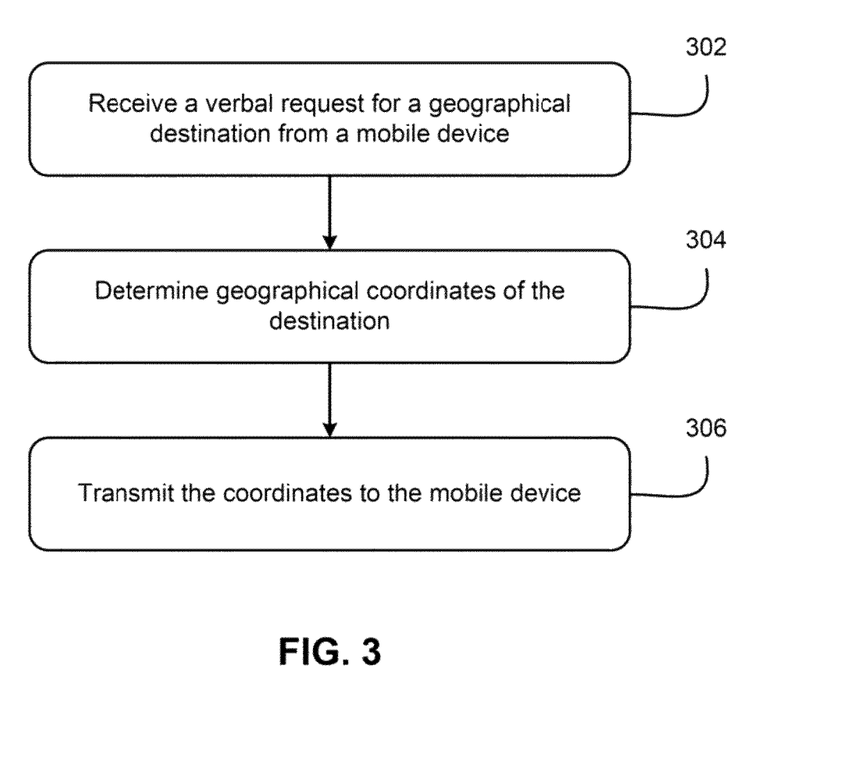
FIG. 3 shows a method according to one embodiment.

Referring to FIG. 3, in operation 302, a verbal request for a geographical destination is received from a mobile device. In operation 304, geographical coordinates of the destination are determined. In operation 306, the coordinates are transmitted to the mobile device.

Figure 4:
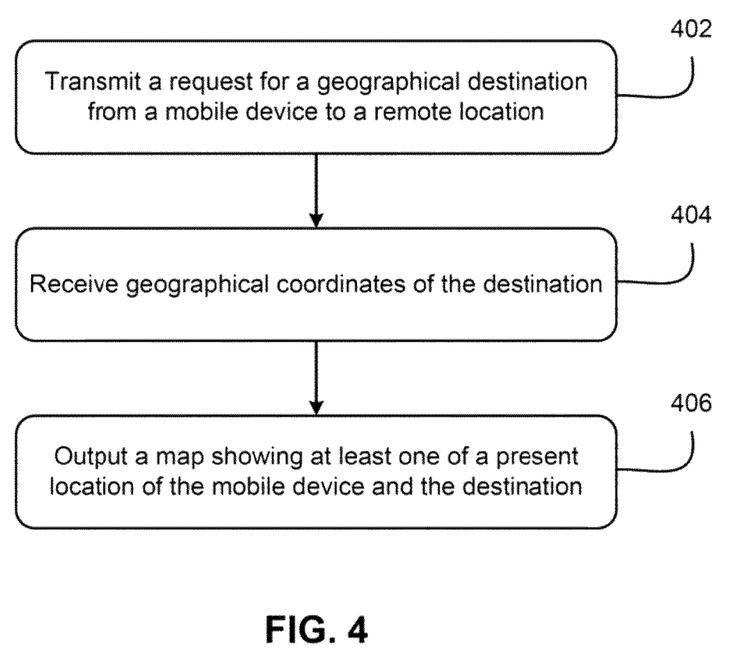
FIG. 4 shows a method according to one embodiment.

Referring to FIG. 4, in operation 402, a request for a geographical destination is transmitted from a mobile device to a remote location. In operation 404, geographical coordinates of the destination are received. In operation 406, a map showing at least one of a present location of the mobile device and the destination is output.

Figure 5:
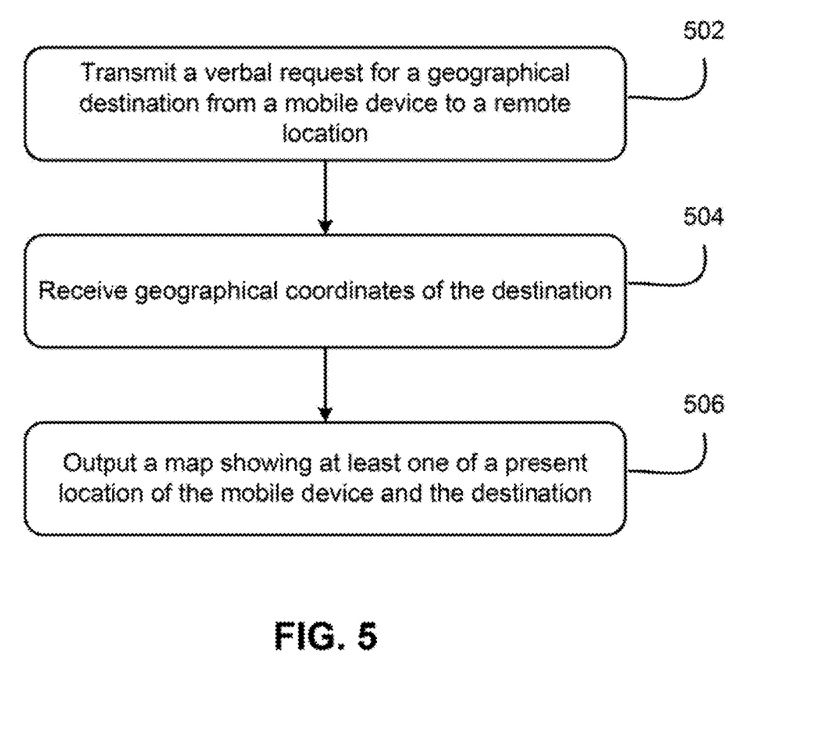
FIG. 5 shows a method according to one embodiment.

Referring to FIG. 5, in operation 502, a verbal request for a geographical destination from a mobile device is transmitted to a remote location. In operation 504, geographical coordinates of the destination are received. In operation 506, a map showing at least one of a present location of the mobile device and the destination is output.

Figure 6:
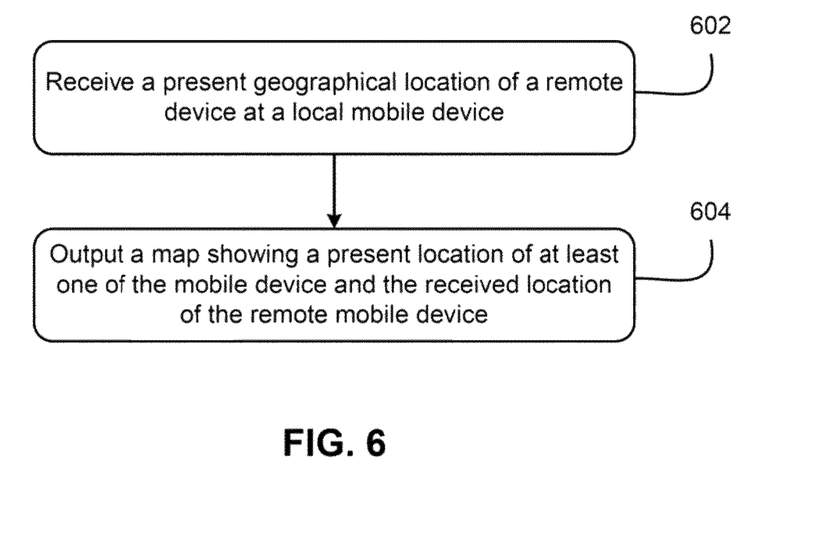
FIG. 6 shows a method according to one embodiment.

Referring to FIG. 6, in operation 602, a present geographical location of a remote mobile device is received at a local mobile device. In operation 604, a map showing a present location of at least one of the local mobile device and the received location of the remote mobile device is output.

In each embodiment, variations are possible at each step. For instance, the request for a geographical location may be initiated by the user of the mobile device, or may be automatically transmitted when certain predefined criteria are met. Furthermore, the request may be a verbal request. The request may be received by a live person or by an automatic device capable of responding to the request with the geographical location desired. The person receiving the request may be at a call center designed to handle such requests, or any other location.

In other embodiments, the geographical coordinates of several potential destinations may be determined and sent to the mobile device. The user can then select which destination to display on the mobile device and/or receive directions to. Further, one of the locations sent to or by the mobile device may be the present location of the mobile device, which can then be displayed on the mobile device as a point on a map, and/or can be used to generate directions from the present location to a desired location. The present location of the mobile device may be determined through GPS, triangulation of the mobile device, proximity to the closest mobile telephone tower, etc.

The file or transmission format or medium of the geographical coordinates, location, etc. may be transmitted to a mobile device using any known method. For example, the coordinates may be send in any format or messaging type that can be recognized by the mobile device as would be known to one of reasonable skill in the relevant art, such as SMS, a markup language such as hyper text markup language (HTML), plain text, rich text, email message, etc. Moreover, where a first mobile device sends its present geographical location information to a remote mobile device, the first mobile device may send the geographical location in the form of an email, a text message, SMS, message, a map with a marker showing the present geographical location generated at the sending device, etc. The receiving mobile device may then output an indication of received geographical location information, the map or a map generated based on the information, etc. Note that the receiving device may download map data and/or other data from a remote server as part of the outputting process. Moreover, any of the foregoing can be used to transmit location information to a receiving device or system, or to transmit location information from a sending device or system.

In another embodiment, the map that may be displayed on the mobile device may have a geographical representation highlighting at least part of a route between the present location and the destination. The map and/or route can include, among other things, roadway names, place names, points of interest, arrows, instructions to turn left or right, distances, etc. Moreover, the output can be updated from time to time based on an updated present location of the mobile device. In addition, text may accompany the map or may be provided alone which describes the present location of the mobile device and/or directions to reach the destination.

In a further embodiment, the mobile device may output verbal commands that contain at least a portion of the directions determined between the present location and the desired destination. This can include, among other things, roadway names, instructions to turn left or right, distances, etc. In addition, the verbal commands may include turn-by-turn directions, which aid a traveler in arriving at a destination or waypoint. Also, the associated visual commands may correspond to the verbal commands, and the visual display, such as a map, may update based on the progress and position of the mobile device. The mobile device may also output at least a portion of the directions in text format.

In still other embodiments, the method may be performed by another mobile device, thus allowing one user's device to send its location back to the requesting device. The user's device may receive the request, and may output the request to the user, e.g., as audible signals.

In some embodiments, the geographical coordinates of one or more potential destinations may be sent to the mobile device from the potential destination. For example, a restaurant may send the coordinates of the restaurant to a mobile phone in response to being called from the phone and asked directions to arrive at the restaurant. In this example, the restaurant may send the coordinates of the restaurant, and the mobile phone may use these coordinates along with a present location of the mobile device as determined through GPS or some other technique, to determine a route between the present location and the restaurant. Coordinates may be longitude and latitude, a street address, or some other code which can be understood by the mobile device such that the location of the restaurant can be pinpointed by the mobile device in proximity to the present location (such as 5 miles north, 3 miles east, two blocks south, etc.).

In more embodiments, the geographical coordinates of one or more potential destinations may be sent to the mobile device from a webpage, website, Internet server, etc. For example, the location of a potential destination may be requested by the mobile device and the website may respond by sending the coordinates of the potential destination. The mobile device may use these coordinates along with a present location of the mobile device as determined through GPS or some other technique, to determine a route between the present location and the potential destination. For example, a user may request the location of the closest pizza restaurants (or any other type of business, residence, person, government agency (such as police station, fire department, etc.), point of interest (e.g., park, stadium, etc.), etc.) on a webpage which can then display a list of potential matches. The user may then select one or more of the returned matches, and the webpage may send the coordinates of one or more of the selected matches to a mobile device where the user may access the locations.

In further approaches, the route calculated can be based on or include some criteria, such as a fastest route, shortest distance, shortest time, whether traveling by automobile or foot, modes of transit such as mass transit including transit stops, fees associated with chosen routes, traffic conditions on chosen routes, restrictions on chosen routes (such as weight limitations; height limitations, walking path availability, time restrictions, etc.), etc.

In one example of use, a user dials 411 from his or her mobile telephone, upon which the mobile telephone transmits the tones, pulses, bits, etc., associated with dialing 411. A connection is made between the telephone and an automated system and/or a call center. The automated system and/or a person at the call center may ask for the query, which is transmitted to the user's telephone. In response, the telephone transmits the user's request for a location of a pizza restaurant near the user's location and/or some other location. In the former case, a location of the mobile telephone may be transmitted from the mobile telephone itself, estimated based on which tower the telephone is communicating through, etc. In the latter case, the user may state a location such as a city, relative to some street address or cross street, etc.

If the name of the pizza restaurant is given, the location of that particular restaurant can be returned. If there are several branches of the restaurant in the vicinity of the mobile telephone, then the locations of the branches can be transmitted to the mobile telephone for output to the user. The user selection can be received and a route to the selected branch can be output. The route may be output as a map, a list of directions, a single direction which after being executed results in the next direction being displayed, a combination of any of the former, etc.

Similarly, if the request is simply for a pizza restaurant (or any other type or class of business, a person or persons, etc.), then the names and/or locations of several pizza restaurants can be sent to the mobile telephone for output to the user for selection of one or more thereof. These names and/or locations may be sent to the mobile telephone by the pizza restaurant (or any other type or class of business, a person or persons, etc.), using a telephone, computer, etc., that is capable of sending the coordinates such that the coordinates can be recognized by the mobile telephone.

A request for a location of a person's home (or business, or present location) can also be made. For instance, assume the user requests directions to Dominic Kotab's home. Coordinates (e.g., a street address, longitude and latitude, etc.) of Dominic Kotab's home may be obtained or derived from a database or other data source, e.g., white pages. The mobile device may be able to generate a route to the received street address based on data stored on the device, or it may retrieve any additional data it may need to calculate the route. Of course, any information that is stored on the mobile device may be used in any of the embodiments in order to expedite the process, or to save on charges that may be incurred for data transmission, time on telephone, etc.

In another approach, a request may include a telephone number, which may be used to determine a location associated with the telephone number. The resultant location can be handled as described herein. For example, a telephone number for a friend's mobile telephone may result in the location of the friend's mobile telephone being returned to the mobile device, and a route between the present location of the mobile device and the friend's mobile telephone can be determined.

Filters can also be applied. For example, the user may indicate a preferred distance of the destination from his or her location and/or some other location, e.g., in a city, relative to some street address or cross street, etc. According to one example, if a user is driving from point A to point B, and desires to stop at a CHEVRON gas station along the way (possibly because the user prefers gasoline with the TECHRON additive), the filter may remove CHEVRON gas stations from the returned locations that do not fall within a predetermined proximity to the path of travel between point A and point B. In another approach, restaurants within some predefined radius of the mobile device, or of some other location, can be output.

Methods for determining a present location of a mobile device may include, but are not limited to, GPS (preferably built into the device), other types of satellite positioning, estimation based on ground communications (e.g., triangulation to towers, signal strength proximity, etc.), etc. Moreover, combinations of any methods disclosed herein may be used.

Data for the maps output by the mobile device may be stored locally, downloaded in portions or as a whole as needed, a combination of these, etc. Moreover, the map may be rendered either via the mobile device or may be generated remotely and sent to the mobile device for output. In addition, the map may be rendered as lines and blocks, as satellite imagery, as a combination of shapes, symbols, and satellite imagery, etc.

To conserve power, the mobile device may selectively (e.g., automatically, under control of a user, etc.) suspend and initiate determination of its present location. For instance, GPS (or other) navigation of a mobile device may be disabled until the destination information is received, upon which it is initiated at least long enough to discern the present location. The GPS navigation may remain on until the destination is reached, or it may periodically request a position until the destination is reached, possibly determining the rate at which to periodically determine the position based in part on the rate of travel.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

What is claimed is:

1. A method, comprising:
   transmitting a first request from a first mobile device for a first location of a first secondary mobile device;
   transmitting a second request from the first mobile device for a first location of a second secondary mobile device;
   receiving at least one of a street address and geographical coordinates of the first location of the first location of the first secondary mobile device;
   receiving at least one of a street address and geographical coordinated of the first location of the second secondary mobile device;
   receiving the at least one of the a street address and geographical coordinates of the first location of the first secondary mobile device at the first mobile device;
   receiving the at least one of the a street address and geographical coordinates of the first location of the second secondary mobile device at the first mobile device;
   causing a first location of the first mobile device to be determined;
   receiving a selection on the first mobile device, the selection corresponding with an intended destination, wherein the intended destination is one of:
      the at least one street address and geographical coordinates of the first location of the first secondary mobile device; and
      the at least one street address and geographical coordinates of the first location of the second secondary mobile device;
   in response to receiving the selection, downloading a plurality of data portions associated with map data, wherein the data portions included data associated with at least three of:
      the first location of the first mobile device;
      the at least one of a street address and geographical coordinates of the first location of the first secondary mobile device;
      the at least one of a street address and geographical coordinates of the first location of the second secondary mobile device; and
      the intended destination;
   rendering the map data based on the plurality of data portions, wherein the rendering occurs on the first mobile device;
   in response to rendering the map data,
      outputting a first portion of the map data having a first graphical representation,
      outputting a second portion of the map data having a second graphical representation,
      outputting a third portion of the map data having a third graphical representation, wherein the first, second, and third graphical representations differ and are displayed, at least in part, simultaneously, and
      outputting a fourth portion of the map data having a fourth graphical representation, wherein the fourth graphical representation includes satellite imagery, wherein at least one of the first portion of the map data, the second portion of the map data, the third portion of the map data, and the fourth portion of the map data includes a route from the first mobile device to the intended destination, wherein the route is caused to be calculated based on criteria including height limitations, weight limitations, and one or more of speed, distance, time, mode of transit, fees, traffic conditions, walking path availability, and time restrictions;
   receiving a present location of the first secondary mobile device, wherein the present location of the first secondary mobile device differs from the first location of the first secondary mobile device;
   receiving a present location of the second secondary mobile device, wherein the present location of the second secondary mobile device differs from the first location of the second secondary mobile device;
   causing a present location of the first mobile device to be determined, wherein the present location of the first mobile device differs from the first location of the first mobile device;
   updating the intended destination based on at least one of the present location of the first secondary mobile device and the present location of the second secondary mobile device;
   updating the route based on at least one of the present location of the first secondary mobile device and the present location of the second secondary mobile device;
   updating the map data based on at least two of:
      the present location of the first secondary mobile device,
      the present location of the second secondary mobile device;
      the intended destination; and
      the present location of the first mobile device
   outputting the first portion of the map data having the first graphical representation based on the updated map data;
   outputting the second portion of the map data having the second graphical representation based on the updated map data;
   outputting the third portion of the map data having the third graphical representation based on the updated map data;
   outputting the fourth portion of the map data having the fourth graphical representation based on the updated map data.

2. A method as recited in claim 1, wherein the first request is a verbal request.

3. A method as recited in claim 2, wherein a live person receives the verbal request.

4. A method as recited in claim 2, wherein a machine receives and processes at least a portion of the verbal request using voice recognition.

5. A method as recited in claim 1, wherein the first mobile device includes a telephone, and the method further comprises transmitting the map data to the first mobile device for enabling the first mobile device to generate a route between the present location of the first mobile device and the present location of the first secondary mobile device or the present location of the second secondary mobile device.

6. A method as recited in claim 1, wherein the first mobile device is an automobile-mounted device.

7. A method as recited in claim 1, wherein geographical coordinates of several potential geographical destinations are determined and sent at the same time.

8. A method as recited in claim 1, further comprising generating directions from the present location of the first mobile device to the present location of the first secondary mobile device or the present location of the second secondary mobile device, and sending the directions to the first mobile device.

9. A method as recited in claim 1, wherein the method is performed at least in part by a human at a call center.

10. A method as recited in claim 1, wherein the method is performed by another mobile device.

11. A method, comprising:
transmitting a first request for a first location of a first geographical destination from a mobile device to a first remote location;
transmitting a second request for a first location of a second geographical destination from the mobile device to a second remote location;
receiving at least one of a street address and geographical coordinates of the first location of the first geographical destination in a first text message in response to the first request;
receiving at least one of a street address and geographical coordinates of the first location of the second geographical destination in a second text message in response to the second request;
receiving the at least one of a street address and geographical coordinates of the first location of the first geographical destination at the mobile device;
receiving the at least one of a street address and geographical coordinates of the first location of the second geographical destination at the mobile device;
causing a first location of the mobile device to be determined;
receiving a selection on the mobile device within the text message, the selection being received on the mobile device while the mobile device outputs the text message, the selection further corresponding with an intended destination, wherein the intended destination is one of:
the at least one of a street address and geographical coordinates of the first location of the first geographical destination, and
the at least one of a street address and geographical coordinates of the first location of the second geographical destination;
sending a request for map data to a remote server upon receiving the selections wherein the map data includes data associated with at least three of:
the first location of the mobile device;
the at least one of a street address and geographical coordinates of the first location of the first geographical destination;
the at least one of a street address and geographical coordinates of the first location of the second geographical destination; and
the intended destination;
downloading a plurality of data portions associated with the map data to the mobile device from the remote server via wireless signals;
rendering the map data based on the plurality of data portions, wherein the rendering occurs on the mobile device;
outputting a first portion of the map data having a first graphical representation;
outputting a second portion of the map data having a second graphical representation;
outputting a third portion of the map data having a third graphical representation, wherein the first second, and third graphical representations differ, and are displayed, at least in part, simultaneously;
outputting a fourth portion of the map data having a fourth graphical representation, wherein the fourth graphical representation includes satellite imagery, wherein at least one of the first portion of the map data, the second portion of the map data, the third portion of the map data, and the fourth portion of the map data includes a route from the mobile device to the intended destination, wherein the route is caused to be calculated based on criteria including height limitations, weight limitations, and one or more of speed, distance, time, mode of transit, fees, traffic conditions, walking path availability, and time restrictions;
receiving a present location of the first geographical destination, wherein the present location of the first geographical destination differs from the first location of the first geographical destination;
receiving a present location of the second geographical destination, wherein the present location of the second geographical destination differs from the first location of the second geographical destination;
causing a present location of the mobile device to be determined, wherein the present location of the mobile device differs from the first location of the mobile device;
updating the route based on at least one of the present location of the first geographical destination and the presentation location of the second geographical destination;
updating the map data based on at least two of:
the present location of the first geographical destination;
the present location of the second geographical destination;
the intended destination; and
the present location of the mobile device;
outputting the first portion of the map data having the first graphical representation based on the updated map data;
outputting the second portion of the map data having the second graphical representation based on the updated map data;
outputting the third portion of the map data having the third graphical representation based on the updated map data; and
outputting the fourth portion of the map data having the fourth graphical representation based on the updated map data.

12. A method as recited in claim 11, further comprising generating and outputting, on the mobile device, directions from the present location of the mobile device to the present location of the first geographical destination or to the present location of the second geographical destination.

13. A method as recited in claim 12, further comprising updating the present location of the mobile device and updating the map by downloading additional map data.

14. A method as recited in claim 11, further comprising audibly outputting at least a portion of directions to the first geographical destination or to the second geographical destination.

15. A method as recited in claim 11, further comprising outputting at least a portion of directions to the first geographical destination or to the second geographical destination in text, wherein the geographical coordinates of the first geographical destination or of the second geographical destination include a street address of the geographical destination.

16. A method as recited in claim 11, further comprising simultaneously outputting at least a portion of directions to the first geographical destination or to the second geographical destination in text and at least a portion of the directions graphically on the map.

17. A method as recited in claim 11, further comprising simultaneously outputting at least a portion of directions to the first geographical destination or to the second geographical destination audibly and at least a portion of the directions graphically on the map.

18. A method as recited in claim 11, wherein the first request for the first geographical destination or the second request for the second geographical destination is a verbal request.

19. A method as recited in claim 18, wherein a live person receives the verbal request.

20. A method as recited in claim 18, wherein a machine receives and processes at least a portion of the verbal request using voice recognition.

21. A method as recited in claim 11, wherein the mobile device is a telephone.

22. A method as recited in claim 11, wherein the mobile device is an automobile-mounted device.

23. A method as recited in claim 11, wherein geographical coordinates of several potential geographical destinations are concurrently received and output on the mobile device, wherein the selection in the text message is of one of potential geographical destinations.

24. A method, comprising:
receiving first location of a first remote mobile device at a local mobile device, wherein the first location of the first remote mobile device includes at least one of a street address and geographical coordinates;
receiving a first location of a second remote mobile device at the local mobile device, wherein the first location of the second remote mobile device includes at least one of a street address and geographical coordinates;
causing a first location of the local mobile device to be determined;
receiving a selection on the local mobile device, the selection corresponding with an intended destination, wherein the intended destination is one of the first location of the first remote device and the first location of the second remote device;
downloading a plurality of data portions associated with map data, wherein the data portions include data associated with at least three of:
the first location of the first mobile device;
the first location of the first remote device;
the first location of the second remote device; and
the intended destination;
causing a map to be generated on the local mobile device using the plurality of data portions;
outputting a first portion of the map data having a first graphical representation;
outputting a second portion of the map data having a second graphical representation;
outputting a third portion of the map data having a third graphical representation, wherein the first, second, and third graphical representations differ and are displayed, at least in part, simultaneously;
outputting a fourth portion of the map data having a fourth graphical representation, wherein the fourth graphical representation includes satellite imagery, wherein at least one of the first portion of the map data, the second portion of the map data, the third portion of the map data, and the fourth portion of the map data includes a route from the first mobile device to the intended destination, wherein the route is caused to be calculated based on criteria including height limitations, weight limitations, and one or more of speed, distance, time, mode of transit, fees, traffic conditions, walking path availability, and time restrictions;
causing a present location of the local mobile device to be determined, wherein the present location of the local mobile device differs from the first location of the local mobile device;
receiving a present location of the first remote mobile device, wherein the present location of the first remote mobile device differs from the first location of the first remote mobile device;
receiving a present location of the second remote mobile device, wherein the present location of the second remote mobile device differs from the first location of the second remote mobile device;
in response to outputting the first and second portions of the map, showing the present location of the local mobile device, the present location of the first remote mobile device, and the present location of the second remote mobile device;
causing, on the map output by the local mobile device, a route to be generated from the present location of the local mobile device to either the present location of the first remote mobile device or the present location of the second remote mobile device;
causing directions to be generated based on the route; and
outputting one or more audible commands based on the directions generated, wherein the audible commands include at least two of:
roadway names,
instructions to turn, and
a distance.

25. A method as recited in claim 24, wherein the third graphical representation includes highlighting at least part of the route between the local mobile device to the first remote mobile device or second remote mobile device.

26. A method as recited in claim 24, further comprising updating the present location of the local mobile device and updating the map.

27. A method as recited in claim 24, further comprising outputting at least a portion of directions to the present location of the first remote device or to the present location of the second remote mobile device in text.

28. A method as recited in claim 24, wherein at least one of the local mobile devices is a telephone.

29. A method as recited in claim 24, wherein at least one of the local mobile devices is an automobile-mounted device.

30. A method as recited in claim 24, further comprising
updating the output of the map based on an updated present location of the local mobile device; and
simultaneously: sending voice data derived from a microphone of the local mobile device to the remote mobile device, and receiving and outputting the voice data derived from the microphone at the remote mobile device from the remote mobile device on the local mobile device while updating the output of the map.

31. A method as recited in claim 24, further comprising simultaneously receiving textual data from the remote mobile device.

32. A method, comprising:
causing to be determined a present geographical location of a local mobile device;
sending the present geographical location of the local mobile device to a first remote mobile device;
receiving a present geographical location of the first remote mobile device at the local mobile device, wherein the present geographical location of the first remote mobile device includes at least one of a street address and geographical coordinates;
receiving a present geographical location of a second remote device at the local mobile device, wherein the present geographical location of the second remote mobile device includes at least one of a street address and geographical coordinates;
receiving a selection on the local mobile device, the selection corresponding with an intended destination, wherein the intended destination is one of:
    the present geographical location of the first remote mobile device, and
    the present geographical location of the second remote mobile device;
downloading a plurality of data portions associated with map data for generating a map, the map data being associated with at least three of:
    the present location of the local mobile device;
    the present location of the first remote device;
    the present location of the second remote device; and
    the intended destination;
outputting a first portion of the map data having a first graphical representation;
outputting a second portion of the map data having a second graphical representation;
outputting a third portion of the map data having a third graphical representation, wherein the first, second, and third graphical representations differ and are displayed, at least in part, simultaneously; and
outputting a fourth portion of the map data having a fourth graphical representation, wherein the fourth graphical representation includes satellite imagery, wherein at least one of the first portion of the map data, the second portion of the map data, the third portion of the map data, and the fourth portion of the map data includes a route from the first mobile device to the intended destination, wherein the route is caused to be calculated based on criteria including height limitations, weight limitations, and one or more of speed, distance, time, mode of transit, fees, traffic conditions, walking path availability, and time restrictions;
causing to be generated, on the map output by the local mobile device, a route from the present location of the local mobile device to the intended destination;
causing to be determined an updated geographical location of the local mobile device, wherein the updated geographical location of the local mobile device differs from the present geographical location of the local mobile device;
receiving an updated geographical location of the first remote mobile device, wherein the updated geographical location of the first remote mobile device differs from the present geographical location of the first remote mobile device;
receiving an updated geographical location of the second remote mobile device, wherein the updated geographical location of the second remote mobile device differs from the present geographical location of the second remote mobile device;
updating the intended destination based on at least one of:
    the updated geographical location of the first remote mobile device;
    the updated geographical location of the second remote mobile device; and
updating output of the map data based on at least two of:
    the updated geographical location of the local mobile device;
    the updated geographical location of the first remote mobile device;
    the updated geographical location of the second remote mobile device; and
    the updated intended destination;
wherein the output of the map data is further updated periodically until the intended destination is reached.

33. A method as recited in claim 32, wherein the periodic updating includes:
    sending a request for an updated geographical location from the local mobile device to the first remote mobile device,
    sending a request for an updated geographical location from the local mobile device to the second remote mobile device,
    receiving updated geographical location from the first remote mobile device;
    receiving updated geographical location from the second remote mobile device;
    wherein the request to the first remote mobile device and the request to the second remote mobile device are sent, at least in part, based on a rate of travel.

34. A method as recited in claim 9, wherein geographical coordinates of several potential geographical destinations are determined and sent at the same time.

35. A method, comprising:
    transmitting a first verbal request from a first mobile device for a geographical destination associated with a first secondary mobile device, wherein a machine receives and processes at least a portion of the first verbal request using voice recognition;
    transmitting a second verbal request from the first mobile device for a geographical destination associated with a second secondary mobile device, wherein a machine receives and processes at least a portion of the second verbal request using voice recognition;
    receiving a list of potential matches at the first mobile device, the potential matches being associated with at least one of the geographical destination associated with the first secondary mobile device and the geographical destination associated with the second secondary mobile device;
    causing to be determined a geographical location of the first mobile device;
    displaying the list of potential matches on the first mobile device;
    receiving a selection on the first mobile device of one of the matches, the selection corresponding with an intended destination, wherein the intended destination is one of:
        the geographical destination associated with the first secondary mobile device, and
        the geographical destination associated with the second secondary mobile device;
    after receiving the selection, sending a request for map data to a remote server;
    downloading a plurality of data portions associated with the map data to the first mobile device from the remote server via wireless signals, wherein the data portions include data associated with at least three of:
    the geographical location of the first mobile device;
    the geographical location of the first secondary mobile device;
    the geographical location of the second secondary mobile device;
    and the intended destination;

outputting a first portion of a map data having a first graphical representation;
outputting a second portion of the map data having a second graphical representation;
outputting a third portion of the map data having a third graphical representation, wherein the first, second, and third graphical representations differ and are displayed, at least in part, simultaneously; and
outputting a fourth portion of the map data having a fourth graphical representation, wherein the fourth graphical representation includes satellite imagery, wherein at least one of the first portion of the map data, the second portion of the map data, the third portion of the map data, and the fourth portion of the map data includes a route from the first mobile device to the intended destination, wherein the route is caused to be calculated based on criteria including height limitations, weight limitations, and one or more of speed, distance, time, mode of transit, fees, traffic conditions, walking path availability, and time restrictions;
receiving an updated location associated with the first secondary mobile device, wherein the updated location associated with the first secondary mobile device differs from the geographical location associated with the first secondary mobile device;
receiving an updated location associated with the second secondary mobile device, wherein the updated location associated with the second secondary mobile device differs from the geographical location associated with the second secondary mobile device;
causing to be determined an updated location associated with the first mobile device;
updating the intended destination based on at least one of the updated location of the first secondary mobile device and the updated location of the second secondary mobile device;
updating the map data based on at least two of:
 the updated location of the first secondary mobile device;
 the updated location of the second secondary mobile device;
 the intended destination; and
 the updated location of the first mobile device;
outputting the first portion of the map data having the first graphical representation based on the updated map data;
outputting the second portion of the map data having the second graphical representation based on the updated map data;
outputting the third portion of the map data having the third graphical representation based on the updated map data; and
outputting the fourth portion of the map data having the fourth graphical representation based on the updated map data.

36. A method as recited in claim 35, further comprising generating and outputting, on the first mobile device, directions from the updated location associated with the first mobile device to the updated location associated with the first secondary mobile device or the updated location associated with the second secondary mobile device.

37. A method as recited in claim 35, wherein the third graphical representation highlights at least part of a route between the updated location associated with the first mobile device and the updated location associated with the first secondary remote device or the updated location associated with the second secondary remote device.

38. A method as recited in claim 35, further comprising causing to be generated, on the map output by the first mobile device, a route from the first mobile device to the first remote mobile device.

* * * * *